Oct. 8, 1968  G. VALLETEAU DE MOULLIAC  3,404,786
LOCKING SYSTEMS FOR AUTOMATIC COUPLERS
Filed Aug. 8, 1966  6 Sheets-Sheet 1
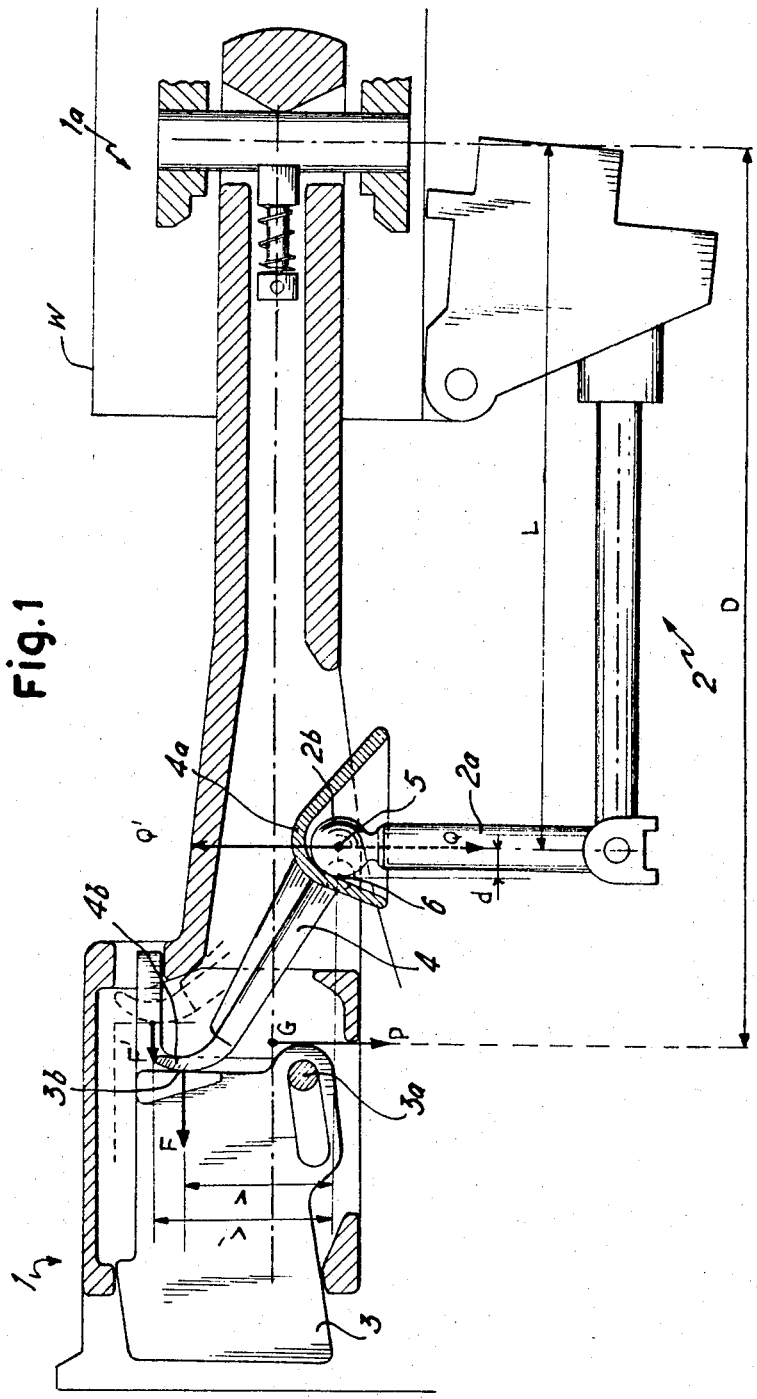

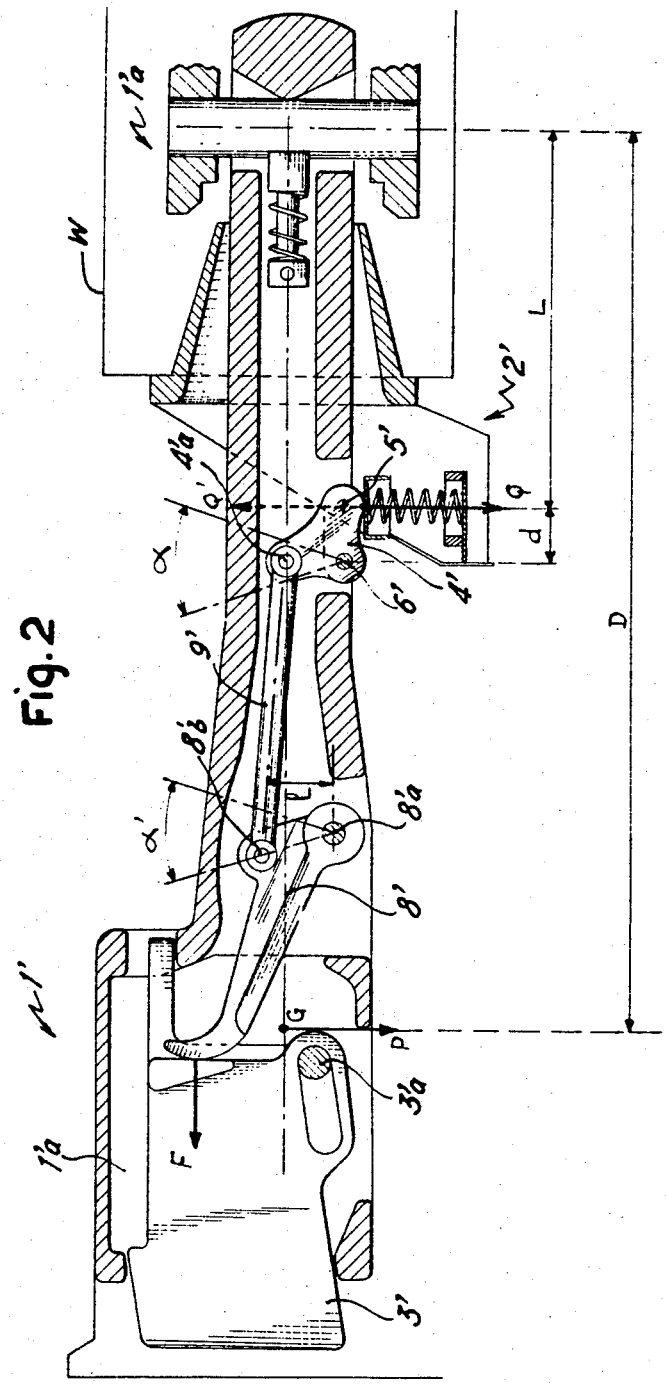

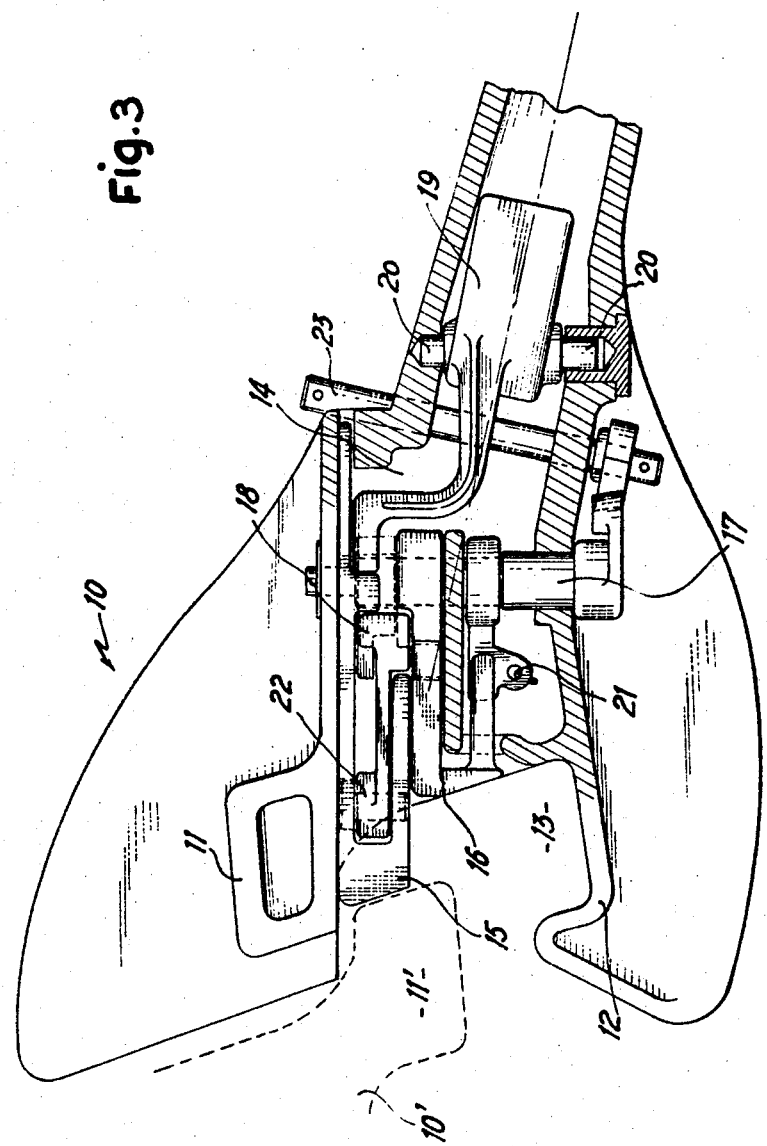

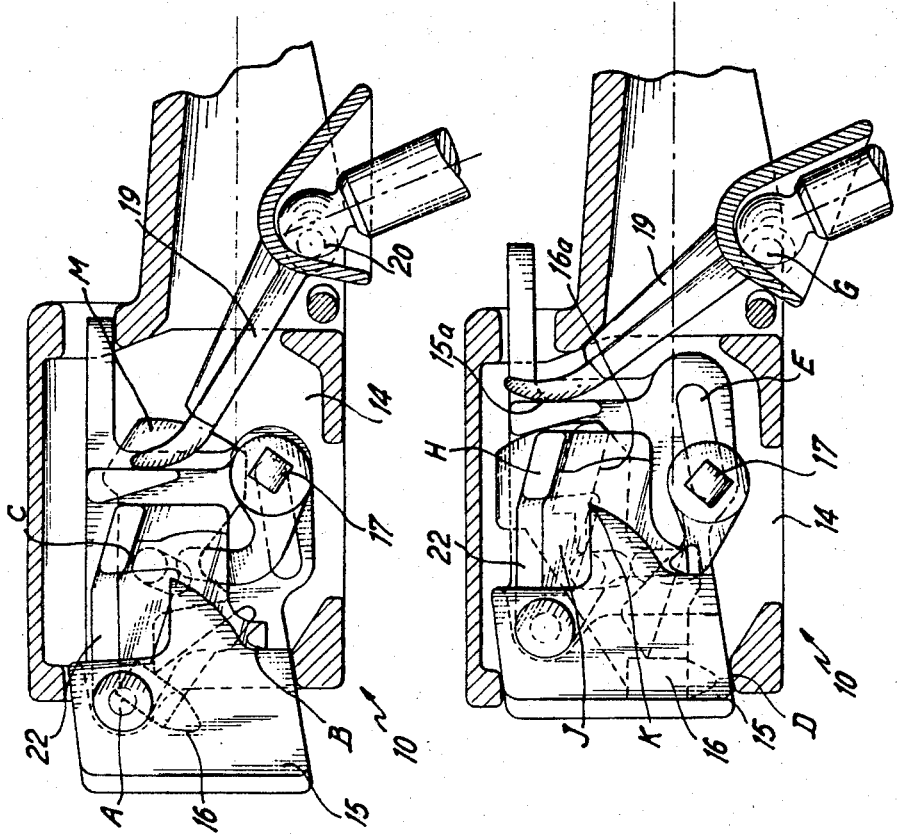

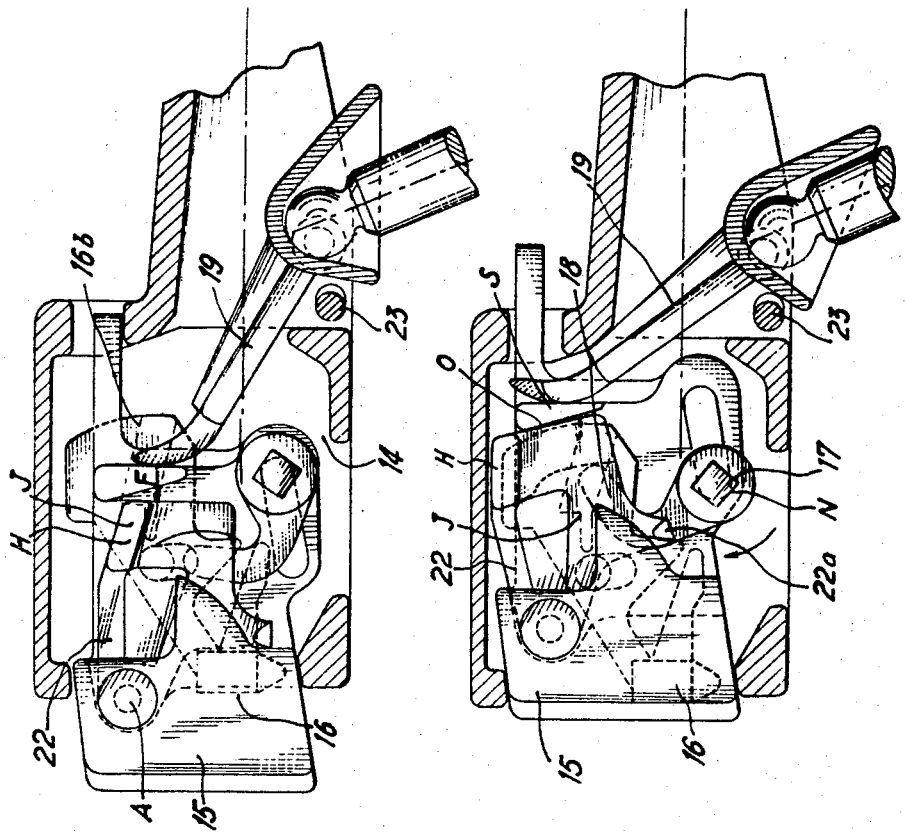

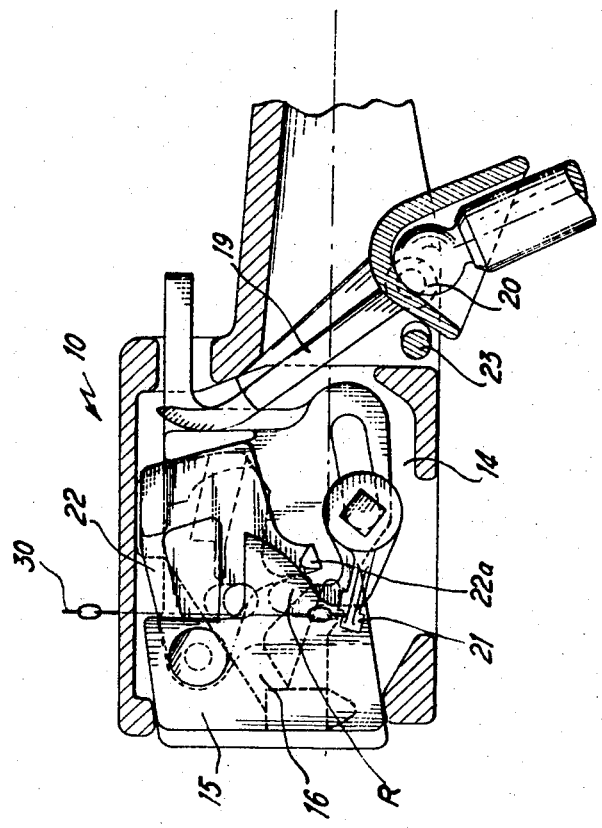

United States Patent Office 3,404,786
Patented Oct. 8, 1968

3,404,786
LOCKING SYSTEMS FOR AUTOMATIC COUPLERS
Guy Valleteau de Moulliac, Argenteuil, France, assignor to Societe Generale Isothermos, Argenteuil, Val-d'Oise, France, a company of France
Filed Aug. 8, 1966, Ser. No. 570,961
Claims priority, application France, Aug. 12, 1965, 28,150
10 Claims. (Cl. 213—100)

ABSTRACT OF THE DISCLOSURE

A locking system carried by the coupler head includes a lock movable between locking and release positions, a suspension system for the head, and an intermediate part mounted on the head and pivotable about a horizontal axis, the intermediate part rests on the suspension system at a point spaced from the horizontal pivot so that the weight of the head causes the intermediate part to pivot and urge the lock toward its locking position.

---

The present invention relates in general to the locking of automatic couplers of the central buffer type on railway vehicles and more particularly the locking of automatic couplers having coupler heads provided with two rigid jaws.

Such coupler heads have been described, in particular, in United States patent application No. 566,385 filed July 19, 1966 in the name of the present applicant entitled "Automatic Coupling Heads of Reduced Height for Railway Vehicles."

It is well known to provide a coupler head with a lock which serves to assure the coupling of the head to a homologous equivalent head by blocking the two heads in their relative positions of coupling. The lock used is a part which is movable, for instance in rotation and/or translation, between two positions, namely a locking position and a release or unlocking position. As a general rule, means are provided so that the lock always tends to occupy the locking position although it is possible to hold it in its unlocked position by acting on a suitable unlock control.

In the known arrangements, the lock is always urged toward its locking position either by means of springs which "cock" the lock or by means of its own weight which effects the "cocking" of the lock by gravity.

The return of the lock by springs has substantial drawbacks which are due essentially to the inevitable variation of the thrust of a spring working in compression along its entire stroke, the relatively complicated nature of the mechanisms employed, and the dangers of damage.

The return of the lock by its own weight requires a lock of large weight and, therefore, of relatively cumbersome mechanism; furthermore, the locking takes place suitably only for average speeds of approach (coming together of two vehicles provided with coupler heads) (namely between 3 and 10 km./hour), defects in coupling occurring for low coupling speeds (from 1 to 3 km./hour) or high coupling speeds (10 to 15 km./hour).

Even the careful combining of the two return means mentioned above cannot completely avoid the various disadvantages indicated above and necessarily leads to complex embodiments.

The present invention relates to a new type of lock which is remarkably simple, strong and effective, employing a new method of returning the lock by a force which is due to the weight of the entire coupler head.

More precisely, the invention relates, for a coupler head of a railway vehicle which is mounted suspended with respect to the vehicle by any system of suspension, to a lock system comprising a movable lock which at all times has a tendency to be returned into locking position, characterized by the fact that the suspension system has its point of application on a removable intermediate part of the head which is mechanically associated with the lock, the weight of the entire head tending at all times to move the intermediate part causing the return of the lock with substantially constant force.

The intermediate part may, for instance, be a pivoted lever the pivot axis of which is offset with respect to the vertical plane of suspension of the head, the lever thus receiving a driving torque which depends on the weight of the entire coupler head, this torque resulting in the application of a force to the lock.

The intermediate part may transmit the return force to the lock either directly or via a suitable transmission system. Direct transmission can, for instance, be applied in the case of a coupler head having a suspension prop and indirect transmission in the case of a coupler head with pendulum suspension.

The present invention also relates to coupler heads provided with a locking system in accordance with the invention.

Finally, and more particularly, the present invention relates to a locking mechanism for an automatic central-buffer coupler of railway vehicles the coupler heads of which, arranged in equivalent manner, each having two rigid jaws with a coupler lock movable in the longitudinal direction of the coupling as well as the special embodiments of coupler heads of this type having such a locking mechanism.

The description given below and the accompanying drawings which are given, in particular, by way of illustration and not of limitation, will make it better understood how the invention can be reduced to practice.

In the accompanying drawings,

FIGURE 1 shows schematically in elevation the locking mechanism of the invention in the case of a locking head with suspension prop.

FIGURE 2 shows schematically in elevation a variant of this mechanism in the case of a locking head with pendulum suspension.

FIGURE 3 shows in top view a coupler head with two rigid jaws and its locking system.

FIGURE 4 shows a view in elevation of the locking system of FIGURE 3 in cocked position.

FIGURE 5 shows a view in elevation of the locking system of FIGURE 3 in automatic coupling position.

FIGURE 6 is a view in elevation of the locking system of FIGURE 3 in the position which it assumes at the end of a coupling.

FIGURE 7 shows a view in elevation of the locking system of FIGURE 3 in unlocked position.

FIGURE 8 shows a view in elevation of the locking system of FIGURE 3 in "cancel maneuver" position.

FIGURE 1 illustrates the locking principle in accordance with the invention. In this figure there is shown a locking head 1 connected by a pivot 1a known per se to a car W, the head 1 being supported by a suspension system 2 comprising a supporting prop 2a with rounded head 2b. In a housing provided in the head 1 there is arranged a movable lock 3 which can be displaced between a "forward" or locking position and a "rear" or release position, the stroke of the lock being limited by suitable stops such as 3a. In the following, the part referred to as the "front" part of an element of the locking mechanism will be that which is furthest from the mounting pivot 1a of the head and the part referred to as the "back" or "rear" part will be that closest to said pivot. In the locking device of FIGURE 1, the weight of the coupler head is supported at the level of the substantially vertical prop 2a by a lever 4 having a rounded cradle 4a which cooperates with a head 2b of the prop 2a to form a rotatable mounting around the axis 5. The lever is rotatably articulated on the head 1 by means of a pin 6 which is offset laterally with respect to 5. The end 4b of the lever 4 opposite the cradle 4a comes to rest at all times against the rear face 3b of the lock 3, with a return force F in locking position, as shown in solid lines in FIGURE 1, and with a return force F' which is slightly different from F, in release position (in FIGURE 1 the position of the parts in release position is shown in dashed lines).

The origin of the force F is easy to understand: it results from the transmission to the lock 3 of the torque applied to the lever 4 at the point of suspension. If G is the center of gravity of the assembly of the head 1 of weight P, D the horizontal distance between said center of gravity and the vertical plane of articulation, L the horizontal distance between the suspension pin 5 and the vertical plane of articulation, then the vertical force Q applied to the lever in the plane 5 satisfies the equation (1) $\quad PD=QL$ (equality of the moments)

To the force Q there corresponds an upward directed reaction Q'.

If $d$ is the horizontal distance between the pin 6 and the vertical plane of Q' and V the vertical distance between the point of application of the lever 3 against the face 3b and the horizontal plane of the pin 6, the horizontal force F will satisfy the equation:

(2) $\quad FV=Q'd$ from which we have, in accordance with 1:

$$F=\frac{Q'd}{V}$$

When one passes from the locking position to the release position, V becomes V', the values of V and V' being very close to each other due to the fact that the longitudinal stroke of the lock 3 is relatively small as compared with the length of the arm 4c of the lever 4. One then has $$F'=\frac{Q'd}{V'} \quad \frac{Q'd}{V}$$

The return force which varies between F and F' remains thus practically constant along the entire stroke of the lock 3.

In the arrangement of FIGURE 2, the same locking principle is used, but as the suspension system is of the pendulum type, a mechanical transmission is interposed between the intermediate part and the lock. The head 1' being associated with the car W by means of an articulation 1'a with a pendulum suspension 2', the lock 3' which is limited in its stroke in the housing 1'a by stops 3'a is actuated by a lever 8' acting on its rear face 3'b. This lever is pivotally mounted on the head 1' via a pin 8'a and a connecting rod 9' articulated at 8'b on 8' connects the lever 8' to the intermediate part 4' on which it is articulated in 4'a. The intermediate part 4' is connected to the head by a pin 6'; it can cooperate with the suspension system so as to permit relative rotation around a pin 5'.

In the plane of 5', the suspension reaction Q' is calculated in the same manner as in the case of the system of FIGURE 1. The horizontal force F resulting from the reaction Q' applied to the lock 3' also varies very little upon the stroke of the lock 3'. For the obtaining of a force F which is suitable for the return of the lock, the man skilled in the art will readily understand that one can adjust the values of the different lever arms employed in the transmission system.

FIGURES 3 to 8 which will now be described relate to a locking mechanism given solely by way of preferred embodiment, for a coupler the homologous coupler heads of which, arranged in equivalent manner, each bear two rigid jaws, such as those which have been described in the aforementioned United States patent application.

The coupler head 10 of this type in accordance with the invention has a lock housing 14 in which there is mounted a transverse control shaft 17, the locking mechanism contained within the housing comprising a lock 15 which is movable longitudinally by sliding on the lower edge of the housing and on the control shaft 17, a movable stop assembly 22 articulated on the lock, a feeler 16 articulated for swing and vertical displacement on the housing, said feeler assuring by means of the stops the holding of the coupling lock 15 in each of its positions only when it is subjected to the pressure of an opposing coupling head 10', a control device 18 mounted on the control shaft 17 and a "cancel maneuver" rocker 21 articulated on the control shaft and actuated from the outside, the lock having always a tendency to be pushed forward under the effect of a pivoting lever 19 which serves as intermediate part for the resting of the head, under the effect of its weight, on the suspension system.

FIGURE 3 shows the coupler head 10 seen in plan view, consisting of a prismatic jaw 11 and of a jaw 12 forming a hook-shaped recess 13 between said jaw 12 and the front part of the head.

The housing 14 receives the parts of the locking mechanism when it is subjected, upon automatic coupling operations, to return movements caused by the interaction of the front face of the prismatic jaw 11' on the front faces of the lock 15 and the feeler 16.

In the unlocking function, as will be seen subsequently, it is always as a result of the action of the control shaft 17 actuating the unlocking cam 18 that the unlocking is obtained. The return of the entire mechanism at suitable speed is always effected in accordance with the principle of the invention by the action of the torque created by the weight of the head transmitted to the mechanism by means of the lever 19 articulated on the trunnions 20.

In case of an unlocking mistake, the cancellation of the maneuver is effected by the raising of the rocker 21 in order to disengage the feeler 16 from the lock 15 and of the stop assembly 22 permitting the "falling" by gravity of the locking mechanism at its initial coupling position.

FIGURE 4 shows, in elevation, the locking mechanism in cocked position—that is to say, ready for the coupling.

The lock 15 is in its maximum forward position pushed back by the return lever 19. The movable stop assembly or oscillating lever 22 connected to the movements of the lock 15 by the pivot A which is rigidly connected with the lock 15 is in position of rest and strikes at B against the face of the lock. The feeler 16 is in inclined position, which position is due to the lack of equilibrium created by the mass M of the feeler which is located behind the point or axis of articulation C which is stationary with respect to the coupler head. The control cam 18 mounted on the shaft 17 is in its position of rest.

The entire mechanism thus shown is ready for an automatic coupling maneuver.

FIGURE 5 shows, in elevation, the locking mechanism in the position it assumes at the end of automatic coupling.

At the beginning of the coupling, the coupler heads approach each other, the jaw 11' of the opposite head pushes against the front face of the lock 15 (FIGURE 3) and moves said lock 15 along a path determined by its contact D with the lower base of the housing 14 and the contact of the housing E provided on the lock with the control shaft 17. This path is practically horizontal; by this return motion, the return lever 19 resting against the rear face 15a of the lock 15 describes a rotation around its pivot axis G on the coupler head, which axis is represented physically by the trunnions 20 fastened to the coupler head.

At the start of the coupling, the movable stop assembly or oscillating lever 22 connected as already described to the movements of the lock first of all releases its own stop H from the recess J of the feeler 16 and then the contact K of the lock 15 with a stop 16a located on the feeler 16 (FIGURE 5) pivots the feeler 16 simultaneously with the return movement of the lock 15, thus permitting it to retract in front of the forward face of the jaw 11', sliding transversely by its contact on the generatrices of the front plane of the coupler head, this rocking maneuver of the feeler 16 taking place in such a manner as to permit the stop H of the oscillating lever 22 to be in freed position, as shown in FIGURE 5.

The component parts of the locking mechanism shown in FIGURE 5 are in their automatic coupling position at their limit position of return.

FIGURE 6 illustrates the second phase of the automatic coupling. Due to the retraction of the jaw 11' of the opposing head before the front face of the lock 15, the lock 15 being no longer maintained in rear position by the reaction of the jaw 11', is pushed back into its initial position under the action of the force F of the return lever 19, the lock during its movement carrying along with it the movable stop 22 articulated at A permitting the sliding of the stop H on the face 16b of the feeler 16, the latter being maintained in vertical position by the action of the jaw 11' which remains at all times in contact with the front face of the feeler 16.

At the end of the movement of the lock 15, the movable stop 22 resumes its position of equilibrium by its own weight and the stop H comes into the recess J of the feeler 16. In this position it is impossible to impart any return movement to the lock 15; as a matter of fact, the movable stop 22 which is associated with it does not permit any "rearward" movement due to the position of the stop H in the recess J of the feeler, which thus avoids any danger of accidental unlocking.

FIGURE 7 illustrates the unlocking operation which takes place from the position shown in FIGURE 6 (heads coupled, locking secured). The unlocking is effected by rotation of the control cam 18 on its pivot pin N, said cam being controlled by the control shaft 17.

In conventional manner, the operating of the shaft 17 can be effected by means of an auxiliary member 23 actuated on both sides of the coupler head by means of a system of rods, not shown.

The cam 18 drives the movable stop 22 which first of all frees its own stop H from the recess J of the feeler 16; the contact O of the movable stop 22 on the rear stop S of the lock 15 makes possible, under the action of the cam 18, the simultaneous rising of the lock 15 and of the stop 22. During this rising, the shape 22a which is rigidly connected with the stop 22 slides on the front face of the form R of the feeler 16 raising the latter at the end of the stroke. As soon as the form R has placed itself in the manner shown in FIGURE 7, the feeler 16 drops by its own weight, thus avoiding any possibility of the dropping of the lock 15 due to the contact of the form 22a with the rear face of the form R, the feeler 16 being itself blocked by the jaw 11' of the opposing coupler head.

In the unlocked position of FIGURE 7, the coupler heads can move apart: the jaw 11' can slide out of the recess 12, the feeler 16 is freed and pivots around its articulation T freeing the form 22a which permits the lock 15 and the part 22 to drop back under the return action exerted by the lever 19 on the lock 15. These movements having been effected, the entire mechanism is again in cocked position and, therefore, ready for a new automatic coupling.

FIGURE 8 illustrates the possibility of cancelling the unlocking maneuver if the latter has been effected by mistake, without there having been any further displacement of the assembled heads. From the unlocking position (FIGURE 7) this "maneuver cancelling" operation is effected by actuating the rocker 21; the latter lifts the feeler 16 freeing the form 22a of the stop 22 from the form R of the feeler 16 thus liberating the lock 15. The actuating of the rocker can be effected by means of a suitable external control comprising, for instance, a suitable lift chain 30.

The embodiment of FIGURES 3 to 8 has been given only as a precise example of a locking arrangement employing the essential principle of the invention in which the weight of the entire coupler head contributes to the locking. In general, the use of this principle has the following advantages over the known systems:

decrease in the weight of the parts constituting the locking device,
simplified manner of movement,
less space taken up,
reduction in number of parts,
ease in assembly,
simplicity of machining,
simplification of the housing,
guarantee of the operation of the lock at all speeds of approach (high and low speeds),
guarantee of operation in all atmospheres and particularly in case of freezing weather.

It is essential to note that due to the limited space taken up by a locking device in accordance with the invention when it is adapted to a coupler head all the mechanisms and accessory organs such as the air coupler, electric coupler, etc., can be mounted again which permits a reduction of the "height" occupied below the axis of the head. Thus, the present application is directed along the same lines as the aforementioned application Ser. No. 566,385.

Finally, it should be emphasized that the return force obtained in accordance with the invention is practically constant while in case of return by compression springs, the forces vary proportionally with the strokes of the springs used.

Of course, the present invention is not limited to the embodiments described, but rather extends to all variants in accordance with its spirit.

In particular, the invention is applicable to all coupler heads whatever their method of suspension.

What is claimed is:

1. In a coupler head mounted on a railway vehicle and movable vertically with respect to the vehicle, a locking system carried by the head and comprising a lock movable between a locking position and a release position, and lock-operating means including an intermediate part and a suspension system cooperating with said intermediate part, said intermediate part being pivotally mounted on the head around a horizontal axis and serving to urge said lock toward its locking position when said intermediate part pivots in one direction, and said suspension system supporting the head via said intermediate part, said intermediate part resting on said suspension system in a vertical plane spaced from said horizontal pivot axis, whereby the weight of said head causes said intermediate part to pivot in said one direction and urge said lock toward its locking position with a substantially constant force.

2. In a coupler head, a locking system in accordance with claim 1 wherein the intermediate part directly transmits a return force to the lock.

3. In a coupler head, a locking system in accordance with claim 1 wherein a mechanical transmission system is interposed between the intermediate part and the lock.

4. A coupler head, in particular of the type having two rigid jaws, comprising a locking housing in which there is mounted a transverse control shaft, the locking mechanism housed in the housing comprising a lock which is movable longitudinally between a locking position and a release position by sliding on the lower edge of the housing and on the control shaft, a movable stop assembly articulated on the lock, a feeler articulated for swinging and vertical displacement on the housing, said feeler by means of stops holding the coupling lock fast in each of its positions only when it is subjected to the pressure of an opposing coupler head, a control device mounted on the control shaft and a maneuver-cancelling rocker articulated on the control shaft and actuated from the outside, a lever pivotally mounted on the head around a horizontal axis and serving to constantly urge said lock toward its locking position when said lever pivots in one direction, a head suspension system, said lever resting on said suspension system in a vertical plane spaced from said horizontal pivot axis, whereby the weight of said head causes said lever to pivot in said one direction and urge said lock toward its locking position with a substantially constant force.

5. A coupler head according to claim 4 wherein said movable stop assembly comprises an oscillating lever articulated on the lock.

6. A coupler head according to claim 5 including a stop located between said oscillating lever and said feeler substantially at the height of articulation of said oscillating lever on the coupling lock and, with respect to the front face of the coupler head, in a withdrawn position with respect to the said articulation, said stop preventing movement of the lock toward its release position when the feeler is in resting position and when the lock is in its locking position.

7. A coupler head according to claim 5 including a stop which excludes another stop located between the oscillating lever and the feeler substantially below the articulation of the oscillating lever on the lock at the height of the lower limit of the latter, said excluding stop limiting the movement of the lock toward its locking position jointly with the swing of the oscillating lever with respect to the lock, when the feeler is in rest position and the lock is in its released position.

8. A coupler head according to claim 5 including a surface located at the base of the feeler, said surface causing said feeler to rise upon pivoting of the rocker articulated on the control shaft, thereby permitting the release of a stop located between the feeler and the oscillating lever when the feeler is in rest position.

9. A coupler head according to claim 4 including a stop located on the feeler, said stop forcing the feeler to assume its position under the pressure of an opposing coupler head upon the rearward movement of the coupling lock towards its position of release, when the feeler is free.

10. A coupler head according to claim 5 and further comprising an un-locking cam carrying said oscillating lever which raises the feeler to secure the stop of the lock and then brings the assembly into position, to bring about un-locking when the lock is in coupling position.

References Cited

UNITED STATES PATENTS

| | | | |
|---|---|---|---|
| 862,204 | 8/1907 | Schroeder | 213—136 |
| 1,990,887 | 2/1935 | Wittmer et al. | 213—100 |
| 2,591,275 | 4/1952 | Metzger | 213—100 |

DRAYTON E. HOFFMAN, *Primary Examiner.*